United States Patent
Yang et al.

(10) Patent No.: US 10,195,689 B2
(45) Date of Patent: Feb. 5, 2019

(54) LASER WELDING OF OVERLAPPING METAL WORKPIECES ASSISTED BY VARYING LASER BEAM PARAMETERS

(71) Applicant: GM GLOBAL TECHNOLOGY OPERATIONS LLC, Detroit, MI (US)

(72) Inventors: David Yang, Shanghai (CN); Wu Tao, Tianmen (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 15/206,856

(22) Filed: Jul. 11, 2016

(65) Prior Publication Data
US 2018/0009060 A1    Jan. 11, 2018

(51) Int. Cl.
*B23K 26/06*     (2014.01)
*B23K 26/322*    (2014.01)
(Continued)

(52) U.S. Cl.
CPC ........ *B23K 26/0626* (2013.01); *B23K 26/082* (2015.10); *B23K 26/0884* (2013.01);
(Continued)

(58) Field of Classification Search
CPC ........ B23K 26/24; B23K 26/03; B23K 26/06; B23K 26/32; B23K 26/21
(Continued)

(56) References Cited

U.S. PATENT DOCUMENTS

| 4,603,089 A * | 7/1986 | Bampton ............... B21D 47/00 |
| | | 219/121.61 |
| 2006/0011592 A1* | 1/2006 | Wang .................. B23K 26/032 |
| | | 219/121.64 |

(Continued)

FOREIGN PATENT DOCUMENTS

| WO | 2016192039 A1 | 12/2016 |
| WO | 2017035728 A1 | 3/2017 |

(Continued)

OTHER PUBLICATIONS

Yang et al., U.S. Appl. No. 15/659,092 entitled "Remote Laser Welding of Overlapping Metal Workpieces Using Helical Path (s)," filed Jul. 25, 2017.

(Continued)

*Primary Examiner* — Samuel M Heinrich
(74) *Attorney, Agent, or Firm* — Reising Ethington P.C.

(57) ABSTRACT

A method of laser welding a workpiece stack-up that includes at least two overlapping metal workpieces is disclosed. The method includes advancing a beam spot of a laser beam relative to a top surface of the workpiece stack-up and along a beam travel pattern to form a laser weld joint, which is comprised of resolodified composite metal workpiece material, that fusion welds the metal workpieces together. And, while the beam spot is being advanced along the beam travel pattern, between a first point and a second point, which may or may not encompass the entire beam travel pattern, at least one of the following laser beam parameters is repeatedly varied: (1) the power level of the (Continued)

laser beam; (2) the travel speed of the laser beam; or (3) the focal position of the laser beam relative to the top surface of the workpiece stack-up.

20 Claims, 5 Drawing Sheets

(51) Int. Cl.
| | |
|---|---|
| *B23K 26/21* | (2014.01) |
| *B23K 26/08* | (2014.01) |
| *B23K 26/32* | (2014.01) |
| *B23K 26/082* | (2014.01) |
| *B23K 26/244* | (2014.01) |
| *B23K 103/04* | (2006.01) |
| *B23K 103/10* | (2006.01) |
| *B23K 103/08* | (2006.01) |
| *B23K 103/16* | (2006.01) |
| *B23K 101/00* | (2006.01) |
| *B23K 101/18* | (2006.01) |
| *B23K 101/34* | (2006.01) |
| *B23K 103/20* | (2006.01) |

(52) U.S. Cl.
CPC .......... *B23K 26/244* (2015.10); *B23K 26/32* (2013.01); *B23K 26/322* (2013.01); *B23K 2101/006* (2018.08); *B23K 2101/18* (2018.08); *B23K 2101/34* (2018.08); *B23K 2103/04* (2018.08); *B23K 2103/10* (2018.08); *B23K 2103/15* (2018.08); *B23K 2103/166* (2018.08); *B23K 2103/20* (2018.08)

(58) Field of Classification Search
USPC .......................................... 219/121.61–121.64
See application file for complete search history.

(56) References Cited

U.S. PATENT DOCUMENTS

| | | | |
|---|---|---|---|
| 2006/0275623 A1* | 12/2006 | Takeda | B23K 35/0261 428/653 |
| 2011/0215554 A1* | 9/2011 | Mayville | B23K 11/02 280/728.2 |
| 2012/0160815 A1* | 6/2012 | Hayashimoto | B23K 26/28 219/121.64 |
| 2015/0364891 A1* | 12/2015 | Kojima | B23K 26/0622 29/34 R |

FOREIGN PATENT DOCUMENTS

| | | |
|---|---|---|
| WO | 2017035729 A1 | 3/2017 |
| WO | 2017075808 A1 | 5/2017 |
| WO | 2017156723 A1 | 9/2017 |
| WO | 2017173650 A1 | 10/2017 |
| WO | 2017173833 A1 | 10/2017 |

OTHER PUBLICATIONS

Yang et al., U.S. Appl. No. 15/684,398 entitled "Method for Laser Welding of Curved Surfaces," filed Aug. 23, 2017.

* cited by examiner

LASER WELDING OF OVERLAPPING METAL WORKPIECES ASSISTED BY VARYING LASER BEAM PARAMETERS

TECHNICAL FIELD

The technical field of this disclosure relates generally to laser welding and, more particularly, to a method of laser welding together two or more overlapping metal workpieces in which all of the overlapping metal workpieces in the stack-up are steel workpieces, aluminum workpieces, or magnesium workpieces.

BACKGROUND

Laser welding is a metal joining process in which a laser beam is directed at a metal workpiece stack-up to provide a concentrated energy source capable of effectuating a weld joint between the overlapping constituent metal workpieces. In general, two or more metal workpieces are first aligned and stacked relative to one another such that their faying surfaces overlap and confront to establish a faying interface (or faying interfaces) that extends through an intended weld site. A laser beam is then directed towards and impinges a top surface of the workpiece stack-up. The heat generated from the absorption of energy from the laser beam initiates melting of the metal workpieces down through the metal workpiece impinged by the laser beam and into the underlying metal workpiece(s) to a depth that intersects each of the established faying interfaces. And, if the power density of the laser beam is high enough, a keyhole is produced within the workpiece stack-up. A keyhole is a column of vaporized metal, which may include plasma, derived from the metal workpieces. The keyhole is surrounded by molten workpiece metal and is an effective absorber of energy from the laser beam, thus allowing for deep and narrow penetration of molten workpiece metal into the stack-up compared to instances in which a keyhole is not present.

The laser beam melts the metal workpieces in the workpiece stack-up in very short order once it impinges the top surface of the stack-up. After the metal workpieces are initially melted, a beam spot of the laser beam may be moved across the top surface of the workpiece stack-up along a predefined path. As the beam spot of the laser beam is advanced along the top surface of the stack-up, molten workpiece metal flows around and behind the advancing beam spot. This penetrating molten workpiece metal quickly cools and solidifies into resolidified composite metal workpiece material. Eventually, the transmission of the laser beam at the top surface of the workpiece stack-up is ceased, at which time the keyhole collapses and any molten workpiece metal still remaining within the stack-up solidifies. The collective resolidified composite metal workpiece material obtained by directing the laser beam at the top surface of the stack-up and advancing the beam spot of the laser beam along a weld path constitutes a laser weld joint and serves to autogenously fusion weld the overlapping metal workpieces together.

The automotive industry is interested in using laser welding to manufacture parts that can be installed on a vehicle. In one example, a vehicle door body may be fabricated from an inner door panel and an outer door panel that are joined together by a plurality of laser weld joints. The inner and outer door panels are first stacked relative to each other and secured in place by clamps. A laser beam is then sequentially directed at multiple weld sites around the stacked panels in accordance with a programmed sequence to form the plurality of laser weld joints. The process of laser welding inner and outer door panels—as well as other vehicle component parts such as those used to fabricate hoods, deck lids, body structures such as body sides and cross-members, load-bearing structural members, engine compartments, etc.—is typically an automated process that can be carried out quickly and efficiently. The aforementioned desire to laser weld metal workpieces together is not unique to the automotive industry; indeed, it extends to other industries that may utilize laser welding including the aviation, maritime, railway, and building construction industries, among others.

The use of laser welding to join together coated metal workpieces that are often used in manufacturing practices can present challenges. For example, steel workpieces often include a zinc-based surface coating (e.g., zinc or a zinc-iron alloy) for corrosion protection. Zinc has a boiling point of about 906° C., while the melting point of the underlying steel substrate it coats is typically greater than 1300° C. Thus, when a steel workpiece that includes a zinc-based surface coating is laser welded, high-pressure zinc vapors are readily produced at the surfaces of the steel workpiece and have a tendency to disrupt the laser welding process. In particular, the zinc vapors produced at the faying interface(s) of the steel workpieces can diffuse into the molten steel created by the laser beam unless an alternative escape outlet is provided through the workpiece stack-up. When an adequate escape outlet is not provided, zinc vapors may remain trapped in the molten steel as it cools and solidifies, which may lead to defects in the resulting laser weld joint—such as porosity—as well as other weld joint discrepancies including blowholes, spatter, and undercut joints. These weld joint deficiencies, if sever enough, can unsatisfactorily degrade the mechanical properties of the laser weld joint.

Steel workpieces that are used in manufacturing practices may also include other types of surface coatings for performance-related reasons in lieu of zinc-based coatings. Other notable surface coatings include aluminum-based coatings such as aluminum, an aluminum-silicon alloy, an aluminum-zinc alloy, or an aluminum-magnesium alloy, to name but a few examples. Unlike zinc-based surface coatings, aluminum-based surface coatings do not boil at a temperature below the melting point of steel, so they are unlikely to produce high-pressure vapors at the faying interface(s) of the workpiece stack-up. Notwithstanding this fact, these surface coatings can be melted, especially if a keyhole is present, and, when in a molten state, can combine with the molten steel derived from the bulk of the steel workpieces. The introduction of such disparate molten materials into the molten steel can lead to a variety of weld defects that have the potential to degrade the mechanical properties of the laser weld joint. Molten aluminum or aluminum alloys (e.g., AlSi, AlZn, or AlMg alloys), for instance, can diminish the purity of the molten steel and form brittle Fe—Al intermetallic phases within the weld joint as well as negatively affect the cooling behavior of the molten steel.

Aluminum workpieces are another intriguing candidate for many automobile component parts and structures due to their high strength-to-weight ratios and their ability to improve the fuel economy of the vehicle. Aluminum workpieces, however, almost always include a surface coating that covers an underlying bulk aluminum substrate. This coating may be a refractory oxide coating that forms passively when fresh aluminum is exposed to atmospheric air or some other oxygen-containing medium. In other instances, the surface coating may be a metallic coating comprised of zinc or tin, or it may be a metal oxide conversion coating comprised of oxides of titanium, zirconium, chromium, or silicon, as disclosed in U.S. Patent Application No. US2014/0360986, the entire contents of which are incorporated herein by reference. The surface coating inhibits corrosion of the underlying aluminum substrate through any of a variety of mechanisms depending on the composition of the coating and may provide other favorable enhancements as well.

One of the main challenges involved in laser welding aluminum workpieces is the relatively high solubility of hydrogen in molten aluminum. Upon solidification of the molten aluminum, dissolved hydrogen becomes trapped, leading to porosity within the laser weld joint. In addition to the challenges posed by hydrogen solubility, the surface coating commonly included in the aluminum workpieces is believed to contribute to the formation of weld defects in the laser weld joint. When, for example, the surface coating of one or more of the aluminum workpieces is a refractory oxide coating, residual oxides can contaminate the molten aluminum created by the laser beam due to the high melting point and mechanical toughness of the coating. In another example, if the surface coating is zinc, the coating may readily vaporize to produce high-pressure zinc vapors that may diffuse into and through the molten aluminum, thus leasing to porosity within the weld joint and other weld deficiencies unless provisions are made to vent the zinc vapors away from the weld site. A variety of other challenges may also complicate the laser welding process in a way that adversely affects the mechanical properties of the laser weld joint.

Magnesium workpieces are yet another intriguing candidate for many automobile component parts and structures due to their high strength-to-weight ratios—even more so that aluminum workpieces—and their ability to improve the fuel economy of the vehicle. Like aluminum workpieces, magnesium workpieces almost always include a surface coating that covers an underlying bulk magnesium substrate. This coating may be a refractory oxide coating that forms passively when fresh magnesium is exposed to atmospheric air or some other oxygen-containing medium. In other instances, the surface coating may be a metallic conversion coating comprised of metal oxides, metal phosphates, or metal chromates. The surface coating included in the magnesium workpiece can help protect the underlying magnesium substrate against protection through any of a number of mechanisms and may also contribute to other favorable properties as well.

The laser welding of magnesium workpieces has historically been more challenging when compared to steel and aluminum workpieces. The major challenge involved in laser welding magnesium workpieces is porosity in the laser weld joint. Such porosity may be derived from entrapped gas in the micropores of the bulk magnesium substrates of the magnesium workpieces, which can undergo expansion and coalescence in the molten magnesium, especially when the magnesium workpieces include a die cast magnesium alloy substrate. Weld joint porosity can also be derived from other factors including the rejection of dissolved hydrogen during solidification of the molten magnesium created by the laser beam. Still further, when the surface coating of the magnesium workpiece(s) is a refractory oxide coating, the magnesium hydroxide component (due to exposure to humidity) of the surface coating can evolve water vapor when heated by the laser beam. The evolved water vapor may diffuse into and through the molten magnesium and contribute to entrained porosity within the laser weld joint. A host of other challenges may also may also disturb the laser welding process and contribute to the formation of a laser weld joint with degraded mechanical properties.

SUMMARY OF THE DISCLOSURE

A method of laser welding a workpiece stack-up that includes overlapping metal workpieces is disclosed. The workpiece stack-up includes two or more metal workpieces, with all of the metal workpieces in the stack-up being steel workpieces, aluminum workpieces, or magnesium workpieces. In other words, the workpiece stack-up includes two or more overlapping steel workpieces, two or more overlapping aluminum workpieces, or two or more overlapping magnesium workpieces. The various metal workpieces included in each of the aforementioned workpiece stack-ups presents challenges when trying to join the workpieces together with a laser beam during assorted implementations of laser welding including remote laser welding and conventional laser welding. The disclosed laser welding method seeks to counter those challenges by repeatedly varying at least one parameter of the laser beam during operation of the laser beam to form a laser weld joint. The effectiveness of repeatedly varying the designated beam parameter(s) enables the disclosed laser welding method to be performed without requiring—but of course not prohibiting—the conventional industry practice of intentionally imposing gaps between the metal workpieces at the faying interface(s), typically by laser scoring or mechanical dimpling, as a mechanism to try and alleviate the diffusion of vapors into the molten workpiece metal.

The disclosed laser welding method involves providing a workpiece stack-up that includes two or more overlapping metal workpieces (e.g., two or more overlapping steel, aluminum, or magnesium workpieces). The metal workpieces are fitted and stacked together such that a faying interface is formed between the faying surfaces of each pair of adjacent overlapping metal workpieces at a weld site. For example, in one embodiment, the workpiece stack-up includes first and second metal workpieces having first and second faying surfaces, respectively, that overlap and confront one another to establish a single faying interface. In another embodiment, the workpiece stack-up includes an additional third metal workpiece situated between the first and second metal workpieces. In this way, the first and second metal workpieces have first and second faying surfaces, respectively, that overlap and confront opposed faying surfaces of the third metal workpiece to establish two faying interfaces. When a third metal workpiece is present, the first and second metal workpieces may be separate and distinct parts or, alternatively, they may be different portions of the same part, such as when an edge of one part is folded over a free edge of another part.

After the workpiece stack-up is assembled and provided, a laser beam is directed at a top surface of the workpiece stack-up. The laser beam impinges the top surface at a beam spot. The term "beam spot," as used herein, broadly refers to the sectional surface area of the laser beam as projected onto a plane oriented along the top surface of the workpiece stack-up. The focused energy of the laser beam is absorbed by the metal workpieces to create a molten metal weld pool that penetrates into the workpiece stack-up from the top surface towards the bottom surface while intersecting each faying interface established within the stack-up. The power density of the delivered laser beam is selected to carry out the practice of laser welding in either conduction welding mode or keyhole welding mode. In conduction welding mode, the power density of the laser beam is relatively low, and the energy of the laser beam is conducted as heat through the metal workpieces to create only the molten metal weld pool. In keyhole welding mode, the power density of the laser beam is high enough to vaporize the metal workpieces beneath the beam spot of the laser beam to produce a keyhole that is surrounded by the molten metal weld pool. The keyhole provides a conduit for efficient energy absorption deeper into workpiece stack-up which, in turn, facilitates deeper and narrower penetration of the molten metal weld pool. The molten metal weld pool and the keyhole, if formed, may fully or partially penetrate the workpiece stack-up.

The beam spot of the laser beam is advanced relative to the top surface of the workpiece stack-up along a beam travel pattern following creation of the molten metal weld pool and, optionally, the keyhole. Advancing the beam spot of the laser beam along the beam travel pattern translates the keyhole and the molten metal weld pool along a route that corresponds to the patterned movement of the beam spot relative to the top surface of the workpiece stack-up. Moreover, the advancement of the beam spot along the beam travel pattern causes the molten metal weld pool to flow around and behind the beam spot—particularly if a keyhole is present—and to elongate in the wake of the advancing beam spot. Depending on the geometry of the beam travel pattern, the molten metal weld pool may solidify into a defined trail behind the forward advancement of the beam spot, or it may merge and grow into a larger melt puddle that solidifies into a consolidated nugget. Regardless of its final shape and structure, the resolidified composite metal workpiece material obtained from translating the molten metal weld pool through the workpiece stack-up is comprised of material from each of the metal workpiece penetrated by the weld pool. The collective resolidified composite metal workpiece material constitutes the laser weld joint that autogenously fusion welds the workpieces together.

During the time the beam spot of the laser beam is being advanced along the beam travel pattern, at least one of the following laser beam parameters is repeatedly varied: (1) the power level of the laser beam; (2) the travel speed of the laser beam; or (3) the focal position of the laser beam relative to the top surface of the workpiece stack-up. Repeatedly varying any or all of those parameters involves constantly increasing and decreasing the parameter(s) over time. More specifically, the power level of the laser beam may be pulsed between a minimum power level and a maximum power level, the travel speed of the laser beam may be fluctuated between a minimum travel speed and a maximum travel speed, and the focal position of the laser beam may be oscillated between a minimum focal position and a maximum focal position. The variations of each parameter may be periodic or nonperiodic with respect to time. Periodic variations are those that exhibit consistent variances over regular time intervals, and nonperiodic variations are those that are not considered to be periodic. In a preferred embodiment, a remote laser welding apparatus is used to form the laser weld joint in the workpiece stack-up. The remote laser welding apparatus includes a scanning optic laser head that houses optical components that can move the beam spot of the laser beam relative to and along the top surface of the workpiece stack-up while simultaneously varying the designated parameter(s) of the laser beam.

The repeated varying of at least one of the laser beam parameters, and in some instances all of them, positively impacts the strength and other mechanical properties of the obtained laser weld joint. Such results can be realized since repeatedly varying at least one of the laser beam parameters helps restrain the temperature of the molten metal weld pool, thereby allowing the weld pool to be kept at lower temperature than would otherwise be the case in the absence of repeatedly varying the laser beam parameter(s), and also acts to agitate the molten metal weld pool. The ability to regulate and maintain a lower temperature in the molten metal weld pool supports better strength and properties in the obtained laser weld joint by reducing the solubility of certain gaseous substances (e.g., zinc, hydrogen, etc.) in the weld pool. And, when lower quantities of dissolved gasses are dissolved in the molten metal weld pool, there is less of a tendency for porosity to form within the laser weld joint as the weld pool solidifies. Additionally, the induced agitation of the molten metal weld pool helps promote the release of gases trapped within the molten material of the weld pool. The evolution of trapped gasses from the molten metal weld pool is another action that can inhibit porosity formation in the obtained laser weld joint. Other weld joint deficiencies—such as spatter, blowholes, and undercut joints—may also be minimized.

DETAILED DESCRIPTION

The disclosed method of laser welding a workpiece stack-up comprised of two or more overlapping metal workpieces involves forming a laser weld joint by repeatedly varying at least one of the power level of the laser beam, the travel speed of the laser beam, or the focal position of the laser beam while advancing a beam spot of a laser beam relative to a top surface of the workpiece stack-up along a beam travel pattern. Any type of laser welding apparatus, including remote and conventional laser welding apparatuses, may be employed to form the laser weld joint while repeatedly varying the designated beam parameter(s). The laser beam may be a solid-state laser beam or a gas laser beam depending on the characteristics and compositions of the metal workpieces being joined and the laser welding apparatus being used. Some notable solid-state lasers that may be used are a fiber laser, a disk laser, a direct diode laser, and a Nd:YAG laser, and a notable gas laser that may be used is a $CO_2$ laser, although other types of lasers may certainly be used. In a preferred implementation of the disclosed method, which is described below in more detail, a remote laser welding apparatus is operated to form the laser weld joint.

The laser welding method may be performed on a variety of workpiece stack-up configurations. For example, the disclosed method may be used in conjunction with a "2T" workpiece stack-up (FIG. 2) that includes two overlapping and adjacent metal workpieces, or it may be used in conjunction with a "3T" workpiece stack-up (FIG. 14) that includes three overlapping and adjacent metal workpieces. Still further, in some instances, the disclosed method may be used in conjunction with a "4T" workpiece stack-up (not shown) that includes four overlapping and adjacent metal workpieces. Additionally, the several metal workpieces included in the workpiece stack-up may have similar or dissimilar compositions, provided they are part of the same base metal group (e.g., steel, aluminum, or magnesium) and may have similar or dissimilar thicknesses at the weld site, if desired. The laser welding method is carried out in essentially the same way to achieve the same results regardless of whether the workpiece stack-up includes two overlapping metal workpieces or more than two overlapping metal workpieces. Any differences in workpiece stack-up configurations can be easily accommodated by adjusting the laser welding process.

Referring now to FIGS. 1-14, a method of laser welding a workpiece stack-up 10 is shown in which the stack-up 10 includes at least a first metal workpiece 12 and a second metal workpiece 14 that overlap at a weld site 16 where laser welding is conducted using a remote laser welding apparatus 18. The first and second metal workpieces 12, 14 provide a top surface 20 and a bottom surface 22, respectively, of the workpiece stack-up 10. The top surface 20 of the workpiece stack-up 10 is made available to the remote laser welding apparatus 18 and is accessible by a laser beam 24 emanating from the remote laser welding apparatus 18. And since only single side access is needed to conduct laser welding, there is no need for the bottom surface 22 of the workpiece stack-up 10 to be made available to the remote laser welding apparatus 18 in the same way as the top surface 20. Moreover, while only one weld site 16 is depicted in the Figures for the sake of simplicity, skilled artisans will appreciate that laser welding in accordance with the disclosed laser welding method can be practiced at multiple different weld sites spread throughout the same workpiece stack-up.

Figure 1:
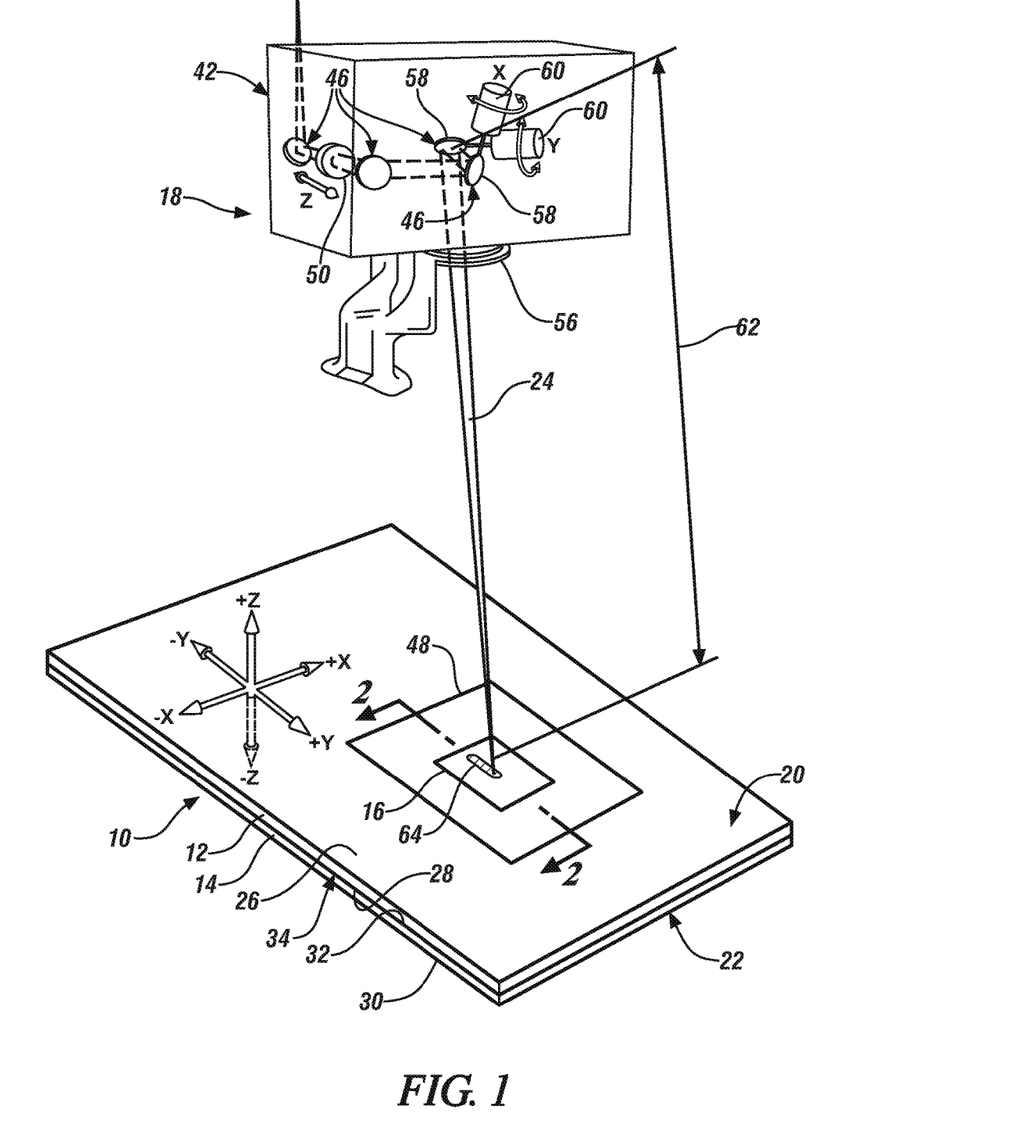
FIG. 1 is a perspective view of an embodiment of a remote laser welding apparatus for forming a laser weld joint within a workpiece stack-up that includes two or more metal workpieces, wherein the laser weld joint fusion welds the two or more metal workpieces together.
Figure 2:
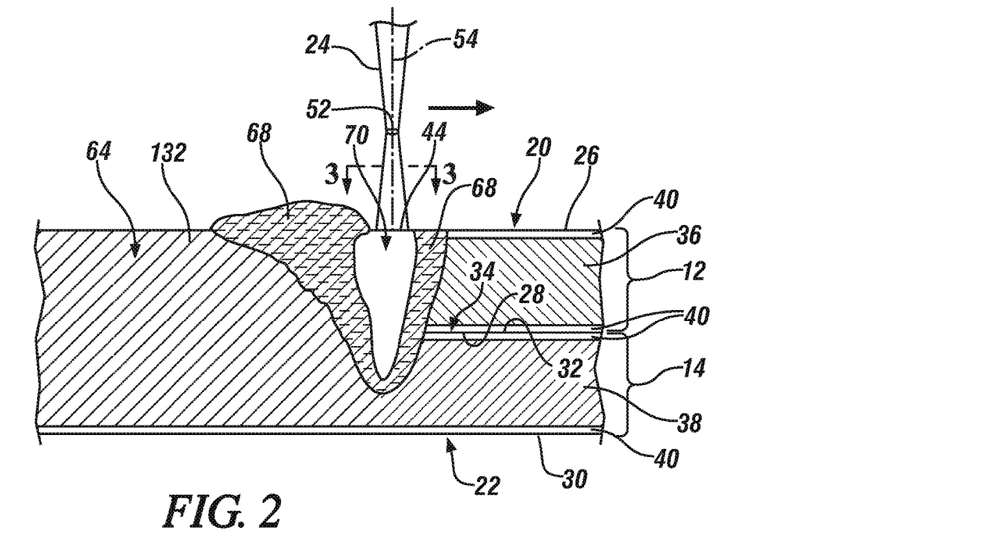
FIG. 2 is a cross-sectional side view (taken along line 2-2) of the workpiece stack-up depicted in FIG. 1 along with a molten metal weld pool and a keyhole produced by a laser beam, wherein both the molten metal weld pool and the keyhole penetrate into the workpiece stack-up during laser welding.

The workpiece stack-up 10 may include only the first and second metal workpieces 12, 14, as shown in FIGS. 1-2. Under these circumstances, and as shown best in FIG. 2, the first metal workpiece 12 includes an exterior outer surface 26 and a first faying surface 28, and the second metal workpiece 14 includes an exterior outer surface 30 and a second faying surface 32. The exterior outer surface 26 of the first metal workpiece 12 provides the top surface 20 of the workpiece stack-up 10 and the exterior outer surface 30 of the second metal workpiece 14 provides the oppositely-facing bottom surface 22 of the stack-up 10. And, since the two metal workpieces 12, 14 are the only workpieces present in the workpiece stack-up 10, the first and second faying surfaces 28, 32 of the first and second metal workpieces 12, 14 overlap and confront to establish a faying interface 34 that extends through the weld site 16. In other embodiments of the disclosed laser welding method, one of which is described below in connection with FIG. 14, the workpiece stack-up 10 may include an additional metal workpiece disposed between the first and second metal workpieces 12, 14 to provide the stack-up 10 with three metal workpieces instead of two.

The term "faying interface" is used broadly in the present disclosure and is intended to encompass a wide range of overlapping relationships between the confronting first and second faying surfaces 28, 32 that can accommodate the practice of laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a structural adhesive—and thus do not experience the type of interfacial abutment that typifies direct contact—yet are in close enough proximity that laser welding can be practiced. As another example, the faying surfaces 28, 32 may establish the faying interface 34 by being separated by gaps that are purposefully imposed. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the faying surfaces 28, 32 spaced apart outside of and around the contact points by up to 1.0 mm and preferably, between 0.2 mm and 0.8 mm.

As shown best in FIG. 2, the first metal workpiece 12 includes a first base metal substrate 36 and the second metal workpiece 14 includes a second base metal substrate 38. At least one of the first or second base metal substrates 36, 38—and possibly both—may include a surface coating 40. Here, in FIG. 2, each of the first and second base metal substrates 36, 38 is coated with a surface coating 40 that, in turn, provides the workpieces 12, 14 with their respective exterior outer surfaces 26, 30 and their respective faying surfaces 28, 32. In other embodiments, only the first base metal substrate 36 includes a surface coating 40 while the second metal substrate 36 is uncoated or bare, or only the second base metal substrate 38 includes the surface coating 40 while the first base metal substrate 36 is uncoated or bare. The exact composition of the surface coating 40 depends largely on the metal composition of the underlying base metal substrate 36, 38. The surface coating(s) 40 may be employed on one or both of the base metal substrates 36, 38 for various reasons including corrosion protection, strength enhancement, and/or to improve processing, among other reasons. The first and second metal workpieces 12, 14 have thicknesses that may be the same or different from one another.

The first and second base metal substrates 36, 38 may be composed of steel, aluminum, or magnesium. If composed of steel, each of the base metal substrates 36, 38 (referred to for the moment as the first and second base steel substrates 36, 38) may be separately composed of any of a wide variety of steels including a low carbon (mild) steel, interstitial-free (IF) steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when press-hardened steel (PHS) is included in the workpiece(s) 12, 14. Moreover, each of the first and second base steel substrates 36, 38 may have been treated to obtain a particular set of mechanical properties, including being subjected to heat-treatment processes such as annealing, quenching, and/or tempering. The first and second base steel substrates 36, 38 may be hot or cold rolled to their final thicknesses.

The surface coating 40 present on one or both of the base steel substrates 36, 38 is preferably comprised of a zinc-based material or an aluminum-based material. Some examples of a zinc-based material include zinc and a zinc alloy such as a zinc-nickel alloy or a zinc-iron alloy. Some examples of a suitable aluminum-based material include aluminum, an aluminum-silicon alloy, an aluminum-zinc alloy, and an aluminum-magnesium alloy. A coating of a zinc-based material may be applied by hot-dip galvanizing (zinc), electro-galvanizing (zinc), or galvannealing (zinc-iron alloy), typically to a thickness of 2 µm to 50 µm, and a coating of an aluminum-based material may be applied by dip coating, typically to a thickness of 2 µm to 30 µm, although other coating procedures and thicknesses of the attained coatings may be employed. Taking into the account the thicknesses of the base steel substrates 36, 38 and their surface coating(s) 40, if present, the overall thickness of each of the first and second steel workpieces 12, 14 preferably ranges from 0.4 mm to 4.0 mm, or more narrowly from 0.5 mm to 2.0 mm, at least at the weld site 16.

If the first and second base metal substrates 36, 38 are composed of aluminum, each of the base metal substrates 36, 38 (referred to for the moment as the first and second base aluminum substrates 36, 38) may be separately composed of unalloyed aluminum or an aluminum alloy that includes at least 85 wt % aluminum. Some notable aluminum alloys that may constitute the first and/or second base aluminum substrates 36, 38 are an aluminum-magnesium alloy, an aluminum-silicon alloy, an aluminum-magnesium-silicon alloy, or an aluminum-zinc alloy. Additionally, each of the base aluminum substrates 36, 38 may be separately provided in wrought or cast form. For example, each of the base aluminum substrates 36, 38 may be composed of a 4xxx, 5xxx, 6xxx, or 7xxx series wrought aluminum alloy sheet layer, extrusion, forging, or other worked article. Or, as another example, each of the base aluminum substrates 36, 38 may be composed a 4xx.x, 5xx.x, or 7xx.x series aluminum alloy casting. Some more specific kinds of aluminum alloys that can be used as the first and/or second base aluminum substrates 36, 38 include, but are not limited to, AA5182 and AA5754 aluminum-magnesium alloy, AA6011 and AA6022 aluminum-magnesium-silicon alloy, AA7003 and AA7055 aluminum-zinc alloy, and Al-10Si—Mg aluminum die casting alloy. The first and/or second base aluminum substrates 36, 38 may be employed in a variety of tempers including annealed (O), strain hardened (H), and solution heat treated (T) depending on the desired properties of the workpieces 12, 14.

The surface coating 40 present on one or both of the base aluminum substrates 36, 38 may be a refractory oxide coating that forms passively when fresh aluminum from the base aluminum substrate 36, 38 is exposed to atmospheric air or some other oxygen-containing medium. The surface coating 40 may also be a metallic coating comprised of zinc or tin, or it may be a metal oxide conversion coating comprised of oxides of titanium, zirconium, chromium, or silicon. A typical thickness of the surface coating 40, if present, lies anywhere from 1 nm to 10 µm depending on the composition of the coating 40 and the manner in which the coating 40 is derived, although other thicknesses may be employed. Taking into account the thicknesses of the base aluminum substrates 36, 38 and their surface coating(s) 40, if present, the overall thickness of each of the first and second aluminum workpieces 12, 14 preferably ranges of 0.3 mm to 6.0 mm, or more narrowly from 0.5 mm to 3.0 mm, at least at the weld site 16.

If the first and second base metal substrates 36, 38 are composed of magnesium, each of the base metal substrates 36, 38 (referred to for the moment as the first and second base magnesium substrates 36, 38) may be separately composed of unalloyed magnesium or a magnesium alloy that includes at least 85 wt % magnesium. Some notable magnesium alloys that may constitute the first and/or second base magnesium substrates 36, 38 are a magnesium-zinc alloy, a magnesium-aluminum alloy, a magnesium-aluminum-zinc alloy, a magnesium-aluminum-silicon alloy, and a magnesium-rare earth alloy. Additionally, each of the base magnesium substrates 36, 38 may be separately provided in wrought (sheet, extrusion, forging, or other worked article) or cast form. A few specific examples of magnesium alloys that can be used as the first and/or second base magnesium substrates 36, 38 include, but are not limited to, AZ91D die cast or wrought (extruded or sheet) magnesium alloy, AZ31B die cast or extruded (extruded or sheet) magnesium alloy, and AM60B die cast magnesium alloy. The first and/or second base magnesium substrates 36, 38 may be employed in a variety of tempers including annealed (O), strain hardened (H), and solution heat treated (W) depending on the desired properties of the workpieces 12, 14.

The surface coating 40 present on one or both of the base magnesium substrates 36, 38 may be a refractory oxide coating that forms passively when fresh magnesium from the base magnesium substrate 36, 38 is exposed to atmospheric air or some other oxygen-containing medium. The surface coating 40 may also be a metallic conversion coating comprised of metal oxides, metal phosphates, or metal chromates. A typical thickness of the surface coating 40, if present, lies anywhere from 1 nm to 10 μm depending on the composition of the coating 40 and the manner in which the coating 40 is derived, although other thicknesses may be employed. Taking into account the thicknesses of the base magnesium substrates 36, 38 and their surface coating(s) 40, if present, the overall thickness of each of the first and second magnesium workpieces 12, 14 preferably ranges of 0.3 mm to 6.0 mm, or more narrowly from 0.5 mm to 3.0 mm, at least at the weld site 16.

Figure 3:
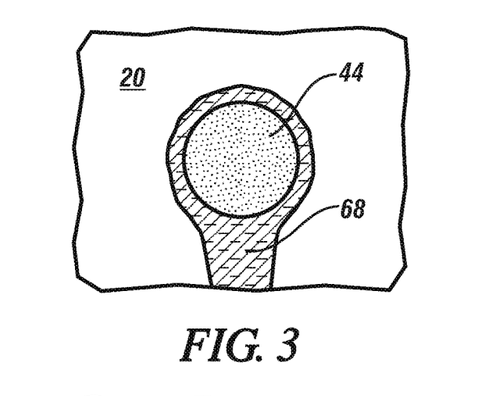
FIG. 3 is a sectional plan view (taken along line 3-3) of a beam spot of the laser beam as projected onto a plane oriented along the top surface of the workpiece stack-up.

Referring back to FIG. 1, the remote laser welding apparatus 18 includes a scanning optic laser head 42. The scanning optic laser head 42 directs the laser beam 24 at the top surface 20 of the workpiece stack-up 10 which, here, is provided by the exterior outer surface 26 of the first metal workpiece 12. The directed laser beam 24 impinges the top surface 20 and, as shown in FIG. 3, has a beam spot 44, which is the sectional area of the laser beam 24 at a plane oriented along the top surface 20 of the stack-up 10. The scanning optic laser head 42 is preferably mounted to a robotic arm (not shown) that can quickly and accurately carry the laser head 42 to many different preselected weld sites 16 on the workpiece stack-up 10 in rapid programmed succession. The laser beam 24 used in conjunction with the scanning optic laser head 42 is preferably a solid-state laser beam operating with a wavelength in the near-infrared range (commonly considered to be 700 nm to 1400 nm) of the electromagnetic spectrum. Additionally, the laser beam 24 has a power level capability that can attain a power density sufficient to produce a keyhole, if desired, within the workpiece stack-up 10 during formation of the laser weld joint. The power density needed to produce a keyhole within the overlapping metal workpieces is typically in the range of 0.5-1.5 MW/cm$^2$.

Some examples of a suitable solid-state laser beam that may be used in conjunction with the remote laser welding apparatus 18 include a fiber laser beam, a disk laser beam, and a direct diode laser beam. Each of those types of lasers are commercially available. A preferred fiber laser beam is a diode-pumped laser beam in which the laser gain medium is an optical fiber doped with a rare earth element (e.g., erbium, ytterbium, neodymium, dysprosium, praseodymium, thulium, etc.). A preferred disk laser beam is a diode-pumped laser beam in which the gain medium is a thin laser crystal disk doped with a rare earth element (e.g., a ytterbium-doped yttrium-aluminum garnet (Yb:YAG) crystal coated with a reflective surface) and mounted to a heat sink. And a preferred direct diode laser beam is a combined laser beam (e.g., wavelength combined) derived from multiple diodes in which the gain medium is multiple semiconductors such as those based on aluminum gallium arsenide (AlGaAS) or indium gallium arsenide (InGaAS). Other solid-state laser beams not specifically mentioned here may of course be used.

The scanning optic laser head 42 includes an arrangement of mirrors 46 that can maneuver the laser beam 24 and translate the beam spot 44 along the top surface 20 of the workpiece stack-up 10 within an operating envelope 48 that encompasses the weld site 16. Here, as illustrated in FIG. 1, the portion of the top surface 20 spanned by the operating envelope 48 is labeled the x-y plane since the position of the laser beam 24 within the plane is identified by the "x" and "y" coordinates of a three-dimensional coordinate system. In addition to the arrangement of mirrors 46, the scanning optic laser head 42 also includes a z-axis focal lens 50, which can move a focal point 52 (FIG. 2) of the laser beam 24 along a longitudinal axis 54 of the laser beam 24 to thus vary the location of the focal point 52 in a z-direction that is oriented perpendicular to the x-y plane in the three-dimensional coordinate system established in FIG. 1. Furthermore, to keep dirt and debris from adversely affecting the optical system components and the integrity of the laser beam 24, a cover slide 56 may be situated below the scanning optic laser head 42. The cover slide 56 protects the arrangement of mirrors 46 and the z-axis focal lens 50 from the surrounding environment yet allows the laser beam 24 to pass out of the scanning optic laser head 42 without substantial disruption.

The arrangement of mirrors 46 and the z-axis focal lens 50 cooperate during operation of the remote laser welding apparatus 18 to dictate the desired movement of the laser beam 24 and its beam spot 44 within the operating envelope 48 at the weld site 16 as well as the position of the focal point 52 along the longitudinal axis 54 of the beam 24. The arrangement of mirrors 46, more specifically, includes a pair of tiltable scanning mirrors 58. Each of the tiltable scanning mirrors 58 is mounted on a galvanometer 60. The two tiltable scanning mirrors 58 can move the location of the beam spot 44—and thus change the point at which the laser beam 24 impinges the top surface 20 of the workpiece stack-up 10—anywhere in the x-y plane of the operating envelope 48 through precise coordinated tilting movements executed by the galvanometers 60. At the same time, the z-axis focal lens 50 controls the location of the focal point 52 of the laser beam 24 in order to help administer the laser beam 24 at the correct power density. All of these optical components 50, 58 can be rapidly indexed in a matter of milliseconds or less to advance the beam spot 44 of the laser beam 24 relative to the top surface 20 of the workpiece stack-up 10 along a beam travel pattern while controlling the location of the focal point 52.

A characteristic that differentiates remote laser welding (also sometimes referred to as "welding on the fly") from other conventional forms of laser welding is the focal length of the laser beam 24. Here, as shown in best in FIG. 1, the laser beam 24 has a focal length 62, which is measured as the distance between the focal point 52 and the last tiltable scanning mirror 58 that intercepts and reflects the laser beam 24 prior to the laser beam 24 impinging the top surface 20 of the workpiece stack-up 10 (also the exterior outer surface 26 of the first metal workpiece 12). The focal length 62 of the laser beam 24 is preferably in the range of 0.4 meters to 2.0 meters with a diameter of the focal point 52 typically ranging anywhere from 350 μm to 700 μm. The scanning optic laser head 42 shown generally in FIG. 1 and described above, as well as others that may be constructed somewhat differently, are commercially available from a variety of sources. Some notable suppliers of scanning optic laser heads and lasers for use with the remote laser welding apparatus 18 include HIGHYAG (Kleinmachnow, Germany) and TRUMPF Inc. (Farmington, Conn., USA).

Figure 13:
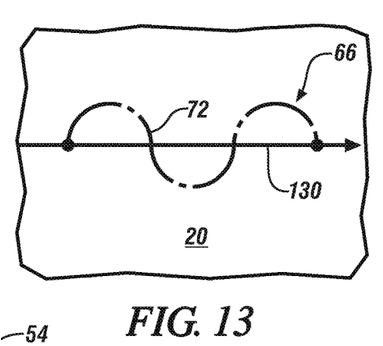
FIG. 13 depicts yet another embodiment of the beam travel pattern as projected onto the top surface of the workpiece stack-up that may be traced by the beam spot of the laser beam during formation of a laser weld joint between the two or more overlapping metal workpieces included in the workpiece stack-up.
Figure 14:
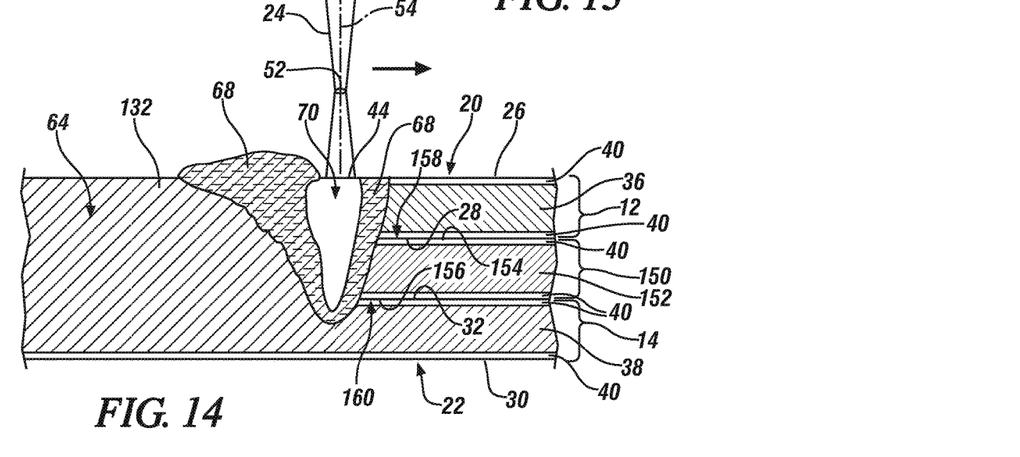
FIG. 14 is a cross-sectional side view of the workpiece stack-up taken from the same perspective as shown in FIG. 2, although here the workpiece stack-up includes three overlapping metal workpieces that establish two faying interfaces, as opposed to two overlapping metal workpieces that establish a single faying interface as depicted in FIG. 2.

In the presently disclosed laser welding method, as illustrated generally in FIGS. 1-4, a laser weld joint 64 (FIGS. 1, 2, and 4) is formed within the workpiece stack-up 10 and between the first and second metal workpieces 12, 14 (or the first, second, and third metal workpieces as illustrated in FIG. 14 and described below) by momentarily melting the metal workpieces 12, 14 with the laser beam 24. In particular, the laser beam 24 is maneuvered by the scanning optic laser head 42 so as to advance the beam spot 44 of the laser beam 24 relative to the top surface 20 of the workpiece stack-up 10 along a beam travel pattern 66 (FIGS. 4 and 8-13) while repeatedly varying at least one of the power level of the laser beam 24, the travel speed of the laser beam 24, or the focal position of the laser beam 24 relative to the top surface 20 of the workpiece stack-up 10. The laser weld joint 64 obtained by the laser beam 24 fusion welds the overlapping first and second metal workpieces 12, 14 together at the weld site 16.

The laser welding method is carried out by first providing the workpiece stack-up 10. This typically involves assembling or fitting the first and second metal workpieces 12, 14 together with overlapping flanges or other bonding regions. Once the workpiece stack-up 10 is provided, the laser beam 24 is directed at, and impinges, the top surface 20 of the stack-up 10 within the weld site 16, thus establishing the beam spot 44 where laser energy enters the stack-up 10. The heat generated from absorption of the focused energy of the laser beam 24 initiates melting of the first and second metal workpieces 12, 14 to create a molten metal weld pool 68 that penetrates into the workpiece stack-up 10 from the top surface 20 towards the bottom surface 22. The molten metal weld pool 68 penetrates far enough into the workpiece stack-up 10 that it intersects the faying interface 34 established between the first and second metal workpieces 12, 14.

The laser beam 24, moreover, preferably has a power density sufficient to vaporize the workpiece stack-up 10 directly beneath the beam spot 44. This vaporizing action produces a keyhole 70, which is a column of vaporized workpiece metal that usually contains plasma. The keyhole 70 is formed within the molten metal weld pool 68 and exerts an outwardly-directed vapor pressure sufficient to prevent the surrounding molten metal weld pool 68 from collapsing inward. And, like the molten metal weld pool 68, the keyhole 70 also penetrates into the workpiece stack-up 10 from the top surface 20 towards the bottom surface 22 and intersects the faying interface 34 established between the first and second metal workpieces 12, 14. The keyhole 70 provides a conduit for the laser beam 24 to deliver energy down into the workpiece stack-up 10, thus facilitating relatively deep and narrow penetration of the molten metal weld pool 68 into the workpiece stack-up 10 and a relatively small surrounding heat-affected zone. The keyhole 70 and the surrounding molten metal weld pool 68 may fully or partially (as shown) penetrate the workpiece stack-up 10.

Figure 4:
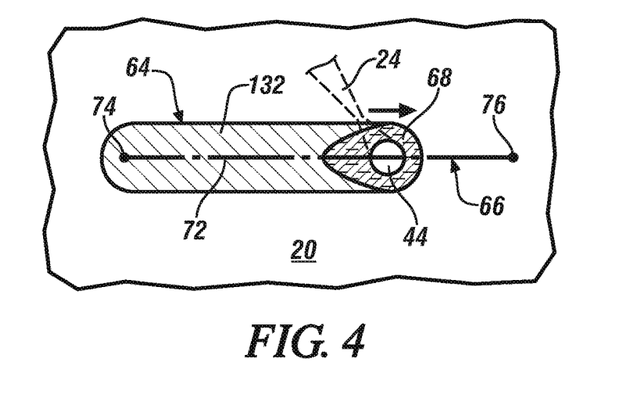
FIG. 4 is a plan view of the top surface of a workpiece stack-up during remote laser welding in which the beam spot of the laser beam is being advanced relative to the top surface of the stack-up along a weld path of a generic representative beam travel pattern.
Figure 5:
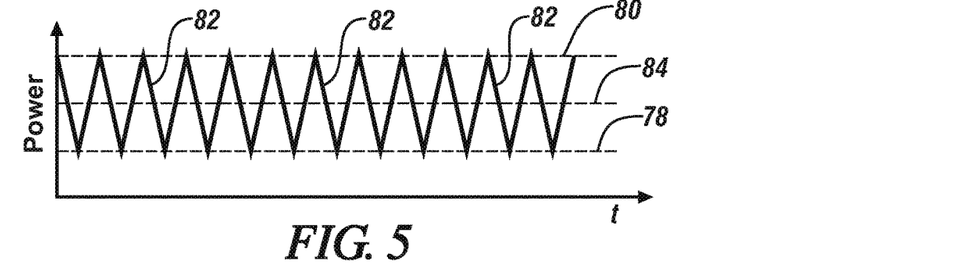
FIG. 5 is graphical illustration of the power level of the laser beam being repeatedly varied according to one embodiment of the disclosed laser welding method.

After the molten metal weld pool 68 and the keyhole 70 are created, and referring now to FIG. 4, the laser beam 24 is maneuvered such that the beam spot 44 of the laser beam 24 is advanced relative to the top surface 20 of the workpiece stack-up along the beam travel pattern 66 that includes one or more weld paths 72. Advancement of the beam spot 44 of the laser beam 24 along the beam travel pattern 66 is managed by precisely controlling the coordinated movements of the tiltable scanning mirrors 58 of the scanning optic laser head 42. Such coordinated movements of the scanning mirrors 58 can rapidly move the beam spot 44 to trace a wide variety of beam travel patterns of simple or complex shape as projected onto the top surface 20 of the workpiece stack-up 10. Once the beam spot 44 of the laser beam 24 has finished tracing the beam travel pattern 66, the transmission of the laser beam 24 is ceases and, accordingly, the laser beam 24 is no longer directed at the top surface 20 of the workpiece stack-up 10 from the scanning optic laser head 42. Here, in FIG. 4, a representative beam travel pattern 66 is depicted showing a single weld path 72 extending between a first point 74 and a second point 76 that may or may not correspond to the points of initial and final laser beam impingement with the top surface 20 of the stack-up 10.

Referring still to FIG. 4, at least one of the following laser beam parameters is repeatedly varied as the beam spot 44 of the laser beam 24 is advanced along the beam travel pattern 66: (1) the power level of the laser beam 24; (2) the travel speed of the laser beam 24; or (3) the focal position of the laser beam 24 relative to a top surface 20 of the workpiece stack-up 10. Such repeated varying of the laser beam parameter(s) is performed as the beam spot 44 is advanced between the spaced apart first and second points 74, 76 of the weld path(s) 72. As such, in one embodiment, the laser beam parameter(s) may be repeatedly varied along each of the one or more weld paths 72 over the course of the entire beam travel pattern 66. In an alternative embodiment, however, the laser beam parameter(s) may be repeatedly varied as the beam spot 44 is advanced over a certain designated part or parts of the beam travel pattern 66, while being held constant as the beam spot 44 is advanced along the other parts of the beam travel pattern 66. If the laser beam parameter(s) are repeatedly varied only some of the time, as is the case in the latter embodiment mentioned above, the parameters may be varied over at least 40% of the beam travel pattern 66 or, more preferably, at least 70% of the beam travel pattern 66. Moreover, the laser beam parameter or the combination of laser beam parameters being repeatedly varied over the course of the beam travel pattern 66 may change at any time.

The act of repeatedly varying any or all of the aforementioned laser beam parameters involves constantly increasing and decreasing the parameter(s) over time. The targeted variances may be periodic, as shown graphically in FIGS. 5-7, or nonperiodic. For example, and referring now to FIG. 5, the power level of the laser beam 24 may be pulsed between a minimum power level 78 and maximum power level 80. Such pulsing involves cyclically increasing the power level of the laser beam 24 from the minimum power level 78 to the maximum power level 80 and back, over time, to produce a series of recurring power pulses 82. These power pulses 82 may have abrupt peaks and troughs (e.g., quick transition between power level increase/decrease), as shown, or constant transition legs (e.g., power level maintained for a period of time), and they may provide the laser beam 24 with a mean power level 84 between the minimum and maximum power levels 78, 80. The maximum power level 80 is preferably at least 0.1%, greater, and more preferably at least 1% greater, than the minimum power level 78, and the frequency (or repetition rate) of the pulses preferably ranges from 10 Hz to 6000 Hz, and more preferably from 10 Hz to 1000 Hz. And while the exact values of the minimum and maximum power levels 78, 80 depends on the compositions of the first and second metal workpieces 12, 14, as well as gauge combination, in many instances the minimum power level 78 is between 0.5 kW and 9.5 kW, or more narrowly between 1 kW and 6 kW and the maximum power level 80 is between 1 kW and 10 kW, or more narrowly between 1.2 kW and 10 kW.

Figure 6:
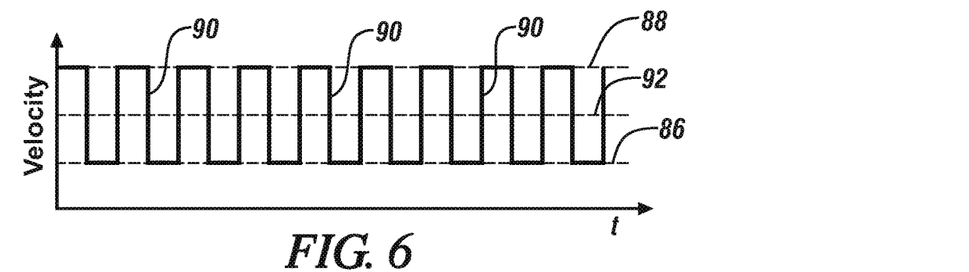
FIG. 6 is a graphical illustration of the travel speed of the laser beam being repeatedly varied according to one embodiment of the disclosed laser welding method.

The travel speed of the laser beam 24 can be repeatedly varied, as depicted in FIG. 6, by fluctuating the travel speed of the beam spot 44 along the top surface 20 of the workpiece stack-up 10 between a minimum travel speed 86 and a maximum travel speed 88. Such travel speed fluctuation involves cyclically increasing the travel speed of the laser beam 24 from the minimum travel speed 86 to the maximum travel speed 88 and back, over time, to produce a series of recurring speed surges 90. These speed surges 90 may have constant transition legs (e.g., travel speed maintained for a period of time), as shown, or abrupt peaks and troughs (e.g., quick transition between travel speed increase/decrease), and they may provide the laser beam 24 with a mean travel speed 92 between the minimum and maximum travel speeds 86, 88. The maximum travel speed 88 of the laser beam 24 is preferably at least 1%, greater, and more preferably at least 5% greater, than the minimum travel speed 86, and the frequency (or repetition rate) of the travel speed fluctuations preferably ranges from 10 Hz to 2000 Hz, and more preferably from 20 Hz to 1000 Hz. And while the exact values of the minimum and maximum travel speeds 86, 88 may be subject to significant deviations, in many instances the minimum travel speed 86 is between 0.8 meters/min (m/min) and 99.8 m/min, or more narrowly between 1 m/min and 45 m/min, and the maximum travel speed 88 is between 1 m/min and 100 m/min, or more narrowly between 3 m/min and 50 m/min.

Figure 7:
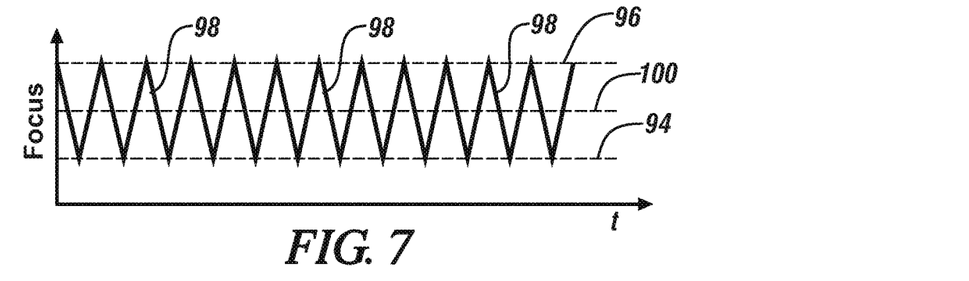
FIG. 7 is a graphical illustration of the focal position of the laser beam being repeatedly varied according to one embodiment of the disclosed laser welding method.
Figure 8:
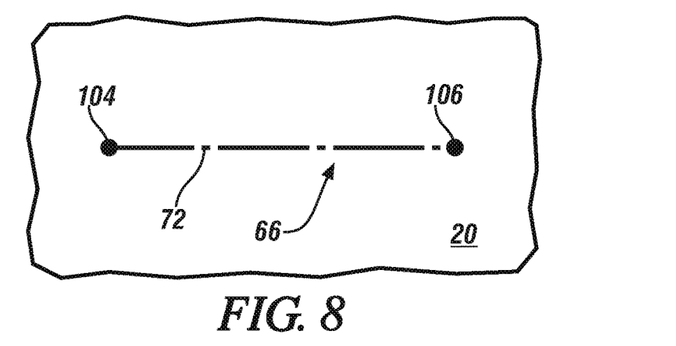
FIG. 8 depicts an embodiment of the beam travel pattern as projected onto the top surface of the workpiece stack-up that may be traced by the beam spot of the laser beam during formation of a laser weld joint between the two or more overlapping metal workpieces included in the workpiece stack-up.
Figure 9:
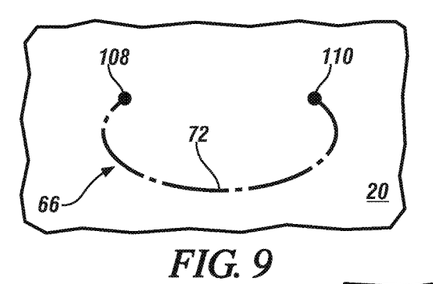
FIG. 9 depicts another embodiment of the beam travel pattern as projected onto the top surface of the workpiece stack-up that may be traced by the beam spot of the laser beam during formation of a laser weld joint between the two or more overlapping metal workpieces included in the workpiece stack-up.

The focal position of the laser beam 24 can be repeatedly varied, as depicted in FIG. 7, by oscillating the position of the focal point 52 along the longitudinal axis 54 of the laser beam 24 between a minimum focal position 94 and a maximum focal position 96 relative to the top surface 20 of the workpiece stack-up 10. Here, the top surface 20 of the workpiece stack-up 10 is considered to be the point of zero reference in the z-direction with displacement of the focal point 52 above the top surface 20 being in the positive (+) z-direction and displacement of the focal point 52 below the top surface 20 being in the negative (−) z-direction. The oscillation of the focal position of the laser beam 24 involves cyclically moving the focal point 52 from the minimum focal position 94 to the maximum focal position 96 (i.e., towards the positive z-direction values or to a more positive z-direction value) and back (i.e., towards the negative z-direction values or to a more negative z-direction value), over time, to produce a series of recurring focal position runs 98.

The focal position runs 98 may have abrupt peaks and troughs (e.g., quick transition between focal position movement in +/− z-direction), as shown, or constant transition legs (e.g., focal position maintained over a period of time), and they may provide the laser beam 24 with a mean focal position 100 between the minimum and maximum focal positions 94, 96. The maximum focal position 96 of the laser beam 24 is preferably at least 5%, greater, and more preferably at least 10% greater, than the minimum focal position 94, and the frequency (or repetition rate) of the focal position oscillations preferably ranges from 10 Hz to 6000 Hz, and more preferably from 20 Hz to 2000 Hz. In many instances, the minimum focal position 94 is between −100 mm and +90 mm, or more narrowly between −50 mm and +30 mm, and the maximum focal position 96 is between −90 mm and +100 mm, or more narrowly between −30 mm and +50 mm.

The beam travel pattern 66 traced by the laser beam 24 may be any of a wide variety of geometric patterns. For instance, and referring now to FIGS. 8-13, the beam travel pattern 66 may be a linear stitch pattern (FIG. 8), a curved or "C-shaped" staple pattern (FIG. 9), a circle pattern (FIG. 10), an elliptical pattern (FIG. 11), a spiral pattern (FIG. 12), or an oscillating pattern (FIG. 13), among others. In the linear stitch pattern of FIG. 8, the beam spot 44 of the laser beam 24 is advanced along a linear weld path 72 from a start point 104 to an end point 106. The start point 104 and the end point 106 may correspond with the first point 74 and the second point 76, respectively, between which at least one of the aforementioned laser beam parameters are varied, although the correlation of those two sets of points is not necessarily required. Likewise, in the staple pattern of FIG. 9, the beam spot 44 of the laser beam 24 is advanced along a curved and circumferentially open weld path 72 from a start point 108 to an end point 110. The curved and circumferentially open weld path 72 may be semi-circular or semi-eliptical path in shape. And, like before, the start point 110 and the end point 110 may or may not correspond to the first point 74 and the second point 76, respectively, between which at least one of the aforementioned laser beam parameters is varied.

Figure 10:
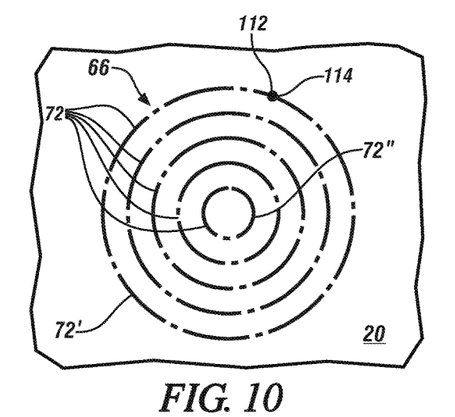
FIG. 10 depicts yet another embodiment of the beam travel pattern as projected onto the top surface of the workpiece stack-up that may be traced by the beam spot of the laser beam during formation of a laser weld joint between the two or more overlapping metal workpieces included in the workpiece stack-up.
Figure 11:
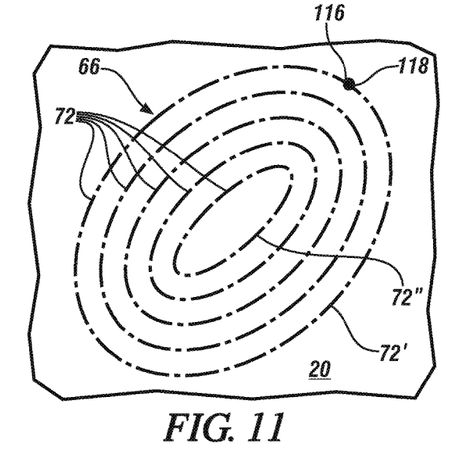
FIG. 11 depicts still another embodiment of the beam travel pattern as projected onto the top surface of the workpiece stack-up that may be traced by the beam spot of the laser beam during formation of a laser weld joint between the two or more overlapping metal workpieces included in the workpiece stack-up.

In the circle pattern of FIG. 10, the beam spot 44 of laser beam 24 is advanced along one or more circular weld paths 72 from a start point 112 to the end point 114 (shown only on one of the illustrated circular weld paths 72). The start point 112 and the end point 114 of the circular weld path(s) may be the same or, alternatively, they may be different. Moreover, if the circle pattern includes a series of radially-spaced and unconnected circular weld paths 72, as shown in FIG. 10, the number of circular weld paths 72 may range from two to twenty. In that regard, the series of circular weld paths 72 includes an outermost circular weld path 72' and an innermost circular weld path 72", and all of the weld paths 72 in between may be evenly spaced apart or they may be spaced apart at varying distances. Regardless of the uniformity in spacing or lack thereof, the distance between radially-aligned points on each pair of adjacent circular weld paths 72 preferably lies between 0.01 mm and 0.8 mm. The elliptical pattern shown in FIG. 11 is similar in all material respects to the circular pattern shown in FIG. 10, including the number and spacing of the weld paths 72, except for the fact that the beam spot 44 of the laser beam 24 is advanced along one or more elliptical weld paths 72 from a start point 116 to the end point 118 as opposed to one or more circular weld paths. In each of the circular and elliptical patterns, the start point 112, 116 and the end point 114, 118 may or may not correspond to the first point 74 and the second point 76, respectively, between which at least one of the aforementioned laser beam parameters is varied.

Figure 12:
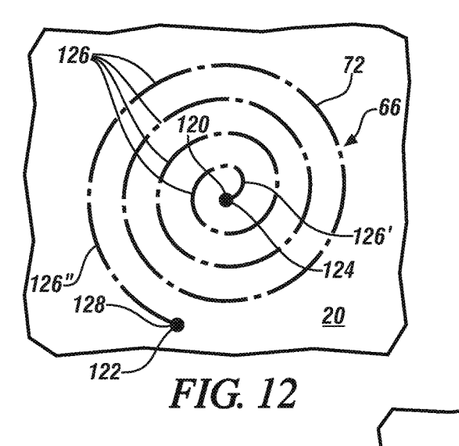
FIG. 12 depicts another embodiment of the beam travel pattern as projected onto the top surface of the workpiece stack-up that may be traced by the beam spot of the laser beam during formation of a laser weld joint between the two or more overlapping metal workpieces included in the workpiece stack-up.

In the spiral pattern of FIG. 12, the laser beam 24 is advanced from a start point 120 to an end point 122 along a single spiral weld path 72 that revolves around itself and expands radially outwardly in doing so, and that further includes from two to twenty turnings 126. The start point 120 of the spiral weld path 72 may be the interior point 124 of the innermost turning 126' of the weld path 72, and the end point 122 may be the exterior point 128 of the outermost turning 126" of the weld path 72, or vice versa. The spiral weld path 72 may be continuously curved, as shown in FIG. 11, and the spiral pattern may further be an Archimedean spiral in which the turnings 126 of the weld path 72 are spaced equidistantly from each other. This distance may range from 0.01 mm and 0.8 mm as measured between radially-aligned points on each pair of adjacent turnings 126. Alternatively, as another example, the spiral weld path 72 may be arranged into an equiangular spiral pattern in which adjacent turnings 126 of the weld path 72 get progressively farther apart. One example of an equiangular spiral pattern is defined by the equation $r(\theta)=e^{-0.1(\theta)}$ in which theta is defined in polar coordinates. Additionally, as before, the start point 120 and the end point 122 of the spiral weld path 72 may correspond with the first point 74 and the second point 76, respectively, between which at least one of the aforementioned laser beam parameters is varied, although the correlation of those two sets of points is not necessarily required.

Other embodiments of the beam travel pattern 66 are indeed contemplated in addition to those shown in FIGS. 8-12. In one such other embodiment, which is depicted in FIG. 13, the beam spot 44 of the laser beam 24 may be advanced along any of the patterns shown in FIGS. 8-12, plus others not shown, while oscillating back and forth in a direction transverse to a mean forward direction 130 of the beam spot 44. For example, the beam spot 44 may be oscillated back-and-forth as it travels in the mean forward direction 130 along the one or more circular/elliptical weld paths 72 shown in FIGS. 10-11 or the single spiral weld path 72 shown in FIG. 12. The back-and-forth oscillations of the beam spot 44 may be sinusoidal, as shown, but can also be zig-zag or rectangular or some other shape. In terms of the size and spacing of the back-and-forth oscillations, both the peak-to-peak amplitude and the wavelength of the transverse deviations of the beam spot 44 preferably range from 0.1 mm to 6.0 mm as the beam spot 44 is moving in the mean forward direction 130 along the weld path 72.

Referring back to FIG. 2, as the beam spot 44 of the laser beam 44 is being advanced along the beam travel pattern 66, the keyhole 70 (if present) and the molten metal weld pool 68 that surrounds the optional keyhole 70 are translated along a corresponding route within the stack-up 10 and relative to the top surface 20 since they track the movement of the beam spot 44. Such advancement of the beam spot 44 causes the penetrating molten metal weld pool 68 to flow around and behind the beam spot 44 within the workpiece stack-up 10, resulting in the molten metal weld pool 68 elongating in the wake of the advancing progression of the beam spot 44. Upon continued advancement and/or halting transmission of the laser beam 24, the molten workpiece material produced by the laser beam 24 and the advancement of the beam spot 44 cools and solidifies into resolidified composite workpiece material 132. Indeed, and depending on the geometric profile of the beam travel pattern 66, the molten metal weld pool 68 may solidify into a defined trail of resolidified composite workpiece material 132, or it may merge and grow into a larger melt puddle that solidifies into a consolidated nugget of resolidified composite workpiece material 132. Regardless of its final shape and structure, the collective resolidified composite metal workpiece material 132 constitutes the laser weld joint 64 that autogenously fusion welds the metal workpieces 12, 14 together at the weld site 16.

The depth of penetration of the keyhole 70 and the surrounding molten metal weld pool 68 is controlled during advancement of the beam spot 44 of the laser beam 24 along the beam travel pattern 66 to ensure the metal workpieces 12, 14 are fusion welded together by the laser weld joint 64. In particular, as mentioned above, the keyhole 70 and the molten metal weld pool 68 penetrate into the workpiece stack-up 10 and intersect the faying interface 34 established between the first and second metal workpieces 12, 14. The keyhole 70 and the molten metal weld pool 68 may fully or partially penetrate the workpiece stack-up 10. For instance, in a preferred embodiment, the keyhole 70 and the molten metal weld pool 68 fully penetrate the workpiece stack-up 10 when the first and second metal workpieces 12, 14 are steel workpieces, but only partially penetrate the workpiece stack-up 10 when the first and second metal workpieces 12, 14 are aluminum workpieces or magnesium workpieces. A fully penetrating keyhole 70 and molten metal weld pool 68 extend entirely through the first and second metal workpieces from the top surface 20 to the bottom surface 22 of the workpiece stack-up 10. A partially penetrating keyhole 70 and molten metal weld pool 68, on the other hand, extends entirely through the first metal workpiece 12 but only partially through the second metal workpiece 14, as illustrated in FIG. 2.

FIGS. 1-2 illustrate the above-described embodiments of the disclosed laser welding method in the context of the workpiece stack-up 10 being a "2T" stack-up that includes only the first and second metal workpieces 12, 14 with their single faying interface 34. The same laser welding method, however, may also be carried out when the workpiece stack-up 10 is a "3T" stack-up that includes an additional third metal workpiece 150 that overlaps and is situated between the first and second metal workpieces 12, 14, as depicted in FIG. 14. In fact, regardless of whether the workpiece stack-up 10 is a 2T or a 3T stack-up, the laser welding method does not have to be modified all that much to form the laser weld joint 64. And, in each instance, the laser weld joint 64 can achieve good quality strength properties by repeatedly varying at least one of the power level of the laser beam 24, the travel speed of the laser beam 24, or the focal position of the laser beam 24 as the beam spot 44 is advanced relative to the top surface 20 of the workpiece stack-up 10 along the beam travel pattern 66.

Referring now to FIG. 14, the additional third metal workpiece 150, if present, includes a third base metal substrate 152 that may be optionally coated with the same surface coating 40 described above. When the workpiece stack-up 10 includes the first, second, and third overlapping metal workpieces 12, 14, 150, the base metal substrate 36, 38, 152 of at least one of the workpieces 12, 14, 150, and sometimes all of them, may include the surface coating 40. As for the characteristics (e.g., composition, thickness, etc.) of the third base metal substrate 152, the descriptions above regarding the first and second base metal substrates 36, 38 of the same base metal group (i.e., steel, aluminum, or magnesium) are equally applicable to that substrate 152 as well. It should be noted, though, that while the same general descriptions apply to the several metal workpieces 12, 14, 150, there is no requirement that the metal workpieces 12, 14, 150 be identical to one another. In many instances, the first, second, and third metal workpieces 12, 14, 150 are different in some aspect from each other whether it be composition, thickness, and/or form, despite being in the same general base metal group.

As a result of stacking the first, second, and third metal workpieces 12, 14, 150 in overlapping fashion to provide the workpiece stack-up 10, the third metal workpiece 150 has two faying surfaces 154, 156. One of the faying surfaces 154 overlaps and confronts the first faying surface 28 of the first metal workpiece 12 and the other faying surface 156 overlaps and confronts the second faying surface 32 of the second metal workpiece 14, thus establishing two faying interfaces 158, 160 within the workpiece stack-up 10 that extend through the weld site 16. These faying interfaces 158, 160 are the same type and encompass the same attributes as the faying interface 34 already described above with respect to FIGS. 1-2. Consequently, in this embodiment as described herein, the exterior outer surfaces 26, 30 of the flanking first and second metal workpieces 12, 14 still face away from each other in opposite directions and constitute the top and bottom surfaces 20, 22 of the workpiece stack-up 10.

The laser weld joint 64 is formed in the "3T" workpiece stack-up 10 by the laser beam 24 in the same manner as previously described. In particular, the laser beam 24 is directed at, and impinges, the top surface 20 of the workpiece stack-up 10 (also the exterior outer surface 26 of the first metal workpiece 12) to create the molten metal weld pool 68 and, optionally, the keyhole 70 within the weld pool 68 beneath the beam spot 44 of the laser beam 24. The keyhole 70 and the molten metal weld pool penetrate into the workpiece stack-up 10 from the top surface 20 towards the bottom surface 22, either fully or partially, and intersect each of the faying interfaces 158, 160 established within the stack-up 10. The beam spot 44 is then advanced relative to the top surface 20 of the workpiece stack-up 10 along the beam travel pattern 66. Any of the exemplary beam travel patterns 66 depicted in FIGS. 8-13, as well as others not depicted, may be traced by the beam spot 44. Moreover, at least one of the power level of the laser beam 24, the travel speed of the laser beam 24, or the focal position of the laser beam 24 may be repeatedly varied as the beam spot 44 of the laser beam 24 is advanced along the beam travel pattern 66, as described above. The resultant weld joint 64 formed by the laser beam 24 includes resolidified composite workpiece material 132 and fusion welds the first, second, and third metal workpieces 12, 14, 150 together at the weld site 16.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up that includes at least two overlapping metal workpieces, the method comprising:

providing a workpiece stack-up that includes overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up;

directing a laser beam at the top surface of the workpiece stack-up, the laser beam impinging the top surface and creating a molten metal weld pool that penetrates into the workpiece stack-up from the top surface towards the bottom surface and that intersects each faying interface established within the workpiece stack-up, the laser beam having a beam spot oriented along the top surface of the workpiece stack-up; and forming a laser weld joint that fusion welds the overlapping metal workpieces together by advancing the beam spot relative to the top surface of the workpiece stack-up and along a beam travel pattern and, additionally, periodically increasing and decreasing over time at least one of a power level of the laser beam to produce a series of recurring power pulses, a travel speed of the laser beam to produce a series of recurring speed surges, or a focal position of the laser beam to produce a series of recurring focal position runs while the beam spot is being advanced along the beam travel pattern.

2. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the first and second faying surfaces of the first and second metal workpieces overlap and confront to establish a first faying interface.

3. The method set forth in claim 1, wherein the first metal workpiece has an exterior outer surface and a first faying surface, and the second metal workpiece has an exterior outer surface and a second faying surface, the exterior outer surface of the first metal workpiece providing the top surface of the workpiece stack-up and the exterior outer surface of the second metal workpiece providing the bottom surface of the workpiece stack-up, and wherein the workpiece stack-up comprises a third metal workpiece situated between the first and second metal workpieces, the third metal workpiece having opposed faying surfaces, one of which overlaps and confronts the first faying surface of the first metal workpiece to establish a first faying interface and the other of which overlaps and confronts the second faying surface of the second metal workpiece to establish a second faying interface.

4. The method set forth in claim 1, wherein periodically increasing and decreasing at least one of the power level of the laser beam, the travel speed of the laser beam, or the focal position of the laser beam comprises at least one of the following:

(a) pulsing the power level of the laser beam periodically between a minimum power level and a maximum power level to produce the series of recurring power pulses, and wherein the maximum power level of the laser beam is at least 0.1% greater than the minimum power level;

(b) fluctuating the travel speed of the beam spot of the laser beam periodically between a minimum travel speed and a maximum travel speed to produce the series of recurring speed surges, and wherein the maximum travel speed of the laser beam is at least 1% greater than the minimum travel speed; or (c) oscillating a focal point of the laser beam along a longitudinal axis of the laser beam between a minimum focal position and a maximum focal position relative to the top surface of the workpiece stack-up to produce the series of recurring focal position runs, and wherein the maximum focal position is at least 5% greater than the minimum focal position.

5. The method set forth in claim 1, wherein a keyhole is produced underneath the beam spot and within the molten metal weld pool.

6. The method set forth in claim 1, wherein all of the overlapping metal workpieces of the workpiece stack-up are steel workpieces, aluminum workpieces, or magnesium workpieces.

7. The method set forth in claim 6, wherein the overlapping metal workpieces of the workpiece stack-up are steel workpieces, and wherein at least one of the steel workpieces includes a surface coating comprised of a zinc-based material or an aluminum-based material.

8. The method set forth in claim 7, wherein at least one of the steel workpieces includes a surface coating comprised of zinc.

9. The method set forth in claim 1, wherein the overlapping metal workpieces of the workpiece stack-up are aluminum workpieces, and wherein at least one of the aluminum workpieces includes a surface coating comprised of a refractory oxide material.

10. The method set forth in claim 1, wherein the overlapping metal workpieces of the workpiece stack-up are magnesium workpieces, and wherein at least one of the magnesium workpieces includes a surface coating comprised of a refractory oxide material.

11. The method set forth in claim 1, wherein the laser beam is a solid-state laser beam.

12. The method set forth in claim 1, wherein advancing the beam spot of the laser beam along the beam travel pattern is performed by a scanning optic laser head having tiltable scanning mirrors whose movements are coordinated to maneuver the laser beam and thus advance the beam spot relative to the top surface of the workpiece stack-up and along the beam travel pattern.

13. A method of laser welding a workpiece stack-up that includes at least two overlapping metal workpieces, the method comprising:
    providing a workpiece stack-up that includes overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, and wherein all of the overlapping metal workpieces of the workpiece stack-up are steel workpieces, aluminum workpieces, or magnesium workpieces;
    advancing a beam spot of a laser beam relative to the top surface of the workpiece stack-up and along a beam travel pattern using a remote laser welding apparatus, such advancement of the beam spot of the laser beam translating a molten metal weld pool, which penetrates into the workpiece stack-up and intersects each faying interface established within the stack up, along a corresponding route to form resolidified composite metal workpiece material derived from each of the metal workpieces penetrated by the molten metal weld pool; and
    varying repeatedly a power level of the laser beam, a travel speed of the laser beam, and a focal position of the laser beam while the beam spot is being advanced along the beam travel pattern from a first point to a second point, wherein varying repeatedly the power level of the laser beam comprises pulsing the power level of the laser beam between a minimum power level of 0.5 kW to 9.5 kW and a maximum power level of 1.0 kW to 10 kW at a frequency that ranges from 10 Hz to 6000 Hz, wherein varying repeatedly the travel speed of the laser beam comprises fluctuating the travel speed of the laser beam between a minimum travel speed of 0.8 m/min to 99.8 m/min and a maximum travel speed of 1 m/min to 100 m/min at a frequency that ranges from 10 Hz to 2000 Hz, and wherein varying repeatedly the focal position of the laser beam comprises oscillating a position of the focal point of the laser beam between a minimum focal position of −100 mm to +90 mm and a maximum focal position of −90 mm and +100 mm relative to the top surface of the workpiece stack-up at a frequency that ranges from 10 Hz to 2000 Hz.

14. The method set forth in claim 13, wherein the power level of the laser beam, the travel speed of the laser beam, and the focal position of the laser beam are repeatedly varied along the entirety of the beam travel pattern.

15. The method set forth in claim 13, wherein the beam travel pattern traced by the beam spot of the laser beam comprises a single spiral weld path that includes between two and twenty turnings.

16. The method set forth in claim 13, wherein the beam travel pattern traced by the beam spot of the laser beam comprises a series or radially-spaced and unconnected circular or elliptical weld paths.

17. The method set forth in claim 1, wherein at least one of the power level of the laser beam, the travel speed of the laser beam, or the focal position of the laser beam is periodically increased and decreased along the entirety of the beam travel pattern.

18. The method set forth in claim 13, wherein the workpiece stack-up includes two metal workpieces that establish a single faying interface, or three metal workpieces that establish two faying interfaces.

19. A method of laser welding a workpiece stack-up that includes at least two overlapping metal workpieces, the method comprising:
    providing a workpiece stack-up that includes two or three overlapping metal workpieces, the workpiece stack-up comprising at least a first metal workpiece and a second metal workpiece, the first metal workpiece providing a top surface of the workpiece stack-up and the second metal workpiece providing a bottom surface of the workpiece stack-up, wherein a faying interface is established between each pair of adjacent overlapping metal workpieces within the workpiece stack-up, the faying interface between each pair of adjacent overlapping metal workpieces comprising direct contact between confronting faying surfaces of the metal workpieces without any imposed gaps therebetween, and wherein all of the overlapping metal workpieces of the workpiece stack-up are steel workpieces, aluminum workpieces, or magnesium workpieces;
    operating a scanning optic laser head to direct a laser beam at the top surface of the workpiece stack-up, the laser beam having a beam spot at the top surface of the workpiece stack-up and creating a molten metal weld pool and a keyhole surrounded by the molten metal weld pool, each of the molten metal weld pool and the keyhole penetrating into the workpiece stack-up from the top surface towards the bottom surface; and
    advancing the beam spot of the laser beam relative to the top surface of the workpiece stack-up and along a beam travel pattern through coordinated movement of tiltable scanning mirrors contained within the scanning optic laser head, such advancement of the beam spot of the laser beam translating the keyhole and the surrounding molten metal weld pool along a corresponding route to form a laser weld joint comprised of resolidified composite metal workpiece material derived from each of the metal workpieces penetrated by the molten metal weld pool; and
    increasing and decreasing alternately over time at least one of a power level of the laser beam, a travel speed of the laser beam, and a focal position of the laser beam while the beam spot is being advanced along the beam travel pattern from a first point to a second point, wherein repeatedly varying the power level comprises pulsing the power level of the laser beam between a minimum power level and a maximum power level, wherein repeatedly varying the travel speed comprises fluctuating the travel speed of the beam spot between a minimum travel speed and a maximum travel speed, and wherein repeatedly varying the focal position comprises oscillating a focal point of the laser beam along a longitudinal axis of the laser beam between a minimum focal position and a maximum focal position relative to the top surface of the workpiece stack-up.

20. The method set forth in claim 19, wherein each of the power level of the laser beam, the travel speed of the laser beam, and the focal position of the laser beam is periodically increased and decreased over time while the beam spot is advanced along the beam travel pattern from the first point to the second point, and wherein the minimum power level of the laser beam is between 0.5 kW and 9.5 kW and the maximum power level of the laser beam is between 1 kW and 10 kW, the minimum travel speed of the laser beam is between 0.8 m/min and 99.8 m/min and the maximum travel speed of the laser beam is between 1 m/min and 100 m/min, and the minimum focal position is between −100 mm and +90 mm and the maximum focal position is between −90 mm and +100 mm.

* * * * *